United States Patent
Park et al.

(10) Patent No.: US 11,658,703 B2
(45) Date of Patent: May 23, 2023

(54) ELECTRONIC DEVICE AND METHOD FOR WIRED AND WIRELESS CHARGING IN ELECTRONIC DEVICE

(71) Applicant: Samsung Electronics Co., Ltd., Gyeonggi-do (KR)

(72) Inventors: Seho Park, Gyeonggi-do (KR); Kyoungwon Kim, Gyeonggi-do (KR); Yusu Kim, Gyeonggi-do (KR); Yongsang Yun, Gyeonggi-do (KR); Chihyun Cho, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/745,221

(22) Filed: May 16, 2022

(65) Prior Publication Data
US 2022/0278552 A1    Sep. 1, 2022

Related U.S. Application Data

(63) Continuation of application No. 16/653,443, filed on Oct. 15, 2019, now Pat. No. 11,355,950.

(30) Foreign Application Priority Data

Oct. 15, 2018   (KR) .................. 10-2018-0122641

(51) Int. Cl.
*H02J 7/00*      (2006.01)
*H04B 5/00*      (2006.01)
(Continued)

(52) U.S. Cl.
CPC .......... *H04B 5/0037* (2013.01); *H02J 7/0063* (2013.01); *H02J 50/10* (2016.02);
(Continued)

(58) Field of Classification Search
USPC ......................... 320/106, 107, 108, 109, 110
See application file for complete search history.

(56) References Cited

U.S. PATENT DOCUMENTS

2012/0161539 A1    6/2012  Kim et al.
2014/0073243 A1*   3/2014  Hijioka ............... H04B 5/0037
                                                            455/41.1
(Continued)

FOREIGN PATENT DOCUMENTS

CN    104052164      8/2016
JP    2001-012176    1/2001
(Continued)

OTHER PUBLICATIONS

International Search Report dated Jan. 31, 2020 issued in counterpart application No. PCT/KR2019/013500, 8 pages.
(Continued)

*Primary Examiner* — Brian Ngo
(74) *Attorney, Agent, or Firm* — The Farrell Law Firm, P.C.

(57) ABSTRACT

Electronic device and method for driving electronic device. The electronic device includes battery, power management integrated circuit (PMIC) configured to control charging status of battery, coil, wireless power circuit electrically connected to coil, communication circuit electrically connected to coil, and processor, wherein processor is configured to, when the wireless power circuit is in a transmission (Tx) mode, transmit a wireless power signal through the coil by using the wireless power circuit, and transmit a signal obtained by frequency shift keying (FSK)-modulating a transmission device parameter by using the communication circuit, to an external electronic device through the coil, and when the wireless power circuit is in a reception (Rx) mode, receive wireless power by using the wireless power circuit to charge the battery, and transmit a signal obtained by
(Continued)

amplitude shift keying (ASK)-modulating a reception device parameter by using the communication circuit, to the external electronic device through the coil.

20 Claims, 12 Drawing Sheets

(51) Int. Cl.
*H02J 50/10* (2016.01)
*H04L 27/04* (2006.01)
*H04B 1/16* (2006.01)
*H04B 1/04* (2006.01)
*H04L 27/12* (2006.01)
*H02J 50/80* (2016.01)

(52) U.S. Cl.
CPC ............... *H02J 50/80* (2016.02); *H04B 1/04* (2013.01); *H04B 1/16* (2013.01); *H04B 5/0081* (2013.01); *H04L 27/04* (2013.01); *H04L 27/12* (2013.01)

(56) References Cited

U.S. PATENT DOCUMENTS

| | | | |
|---|---|---|---|
| 2014/0312852 A1 | 10/2014 | Won et al. | |
| 2016/0126779 A1 | 5/2016 | Park | |
| 2016/0149416 A1 | 5/2016 | Ha et al. | |
| 2016/0190861 A1 | 6/2016 | Cha | |
| 2016/0212006 A1* | 7/2016 | Kim | H04L 27/366 |
| 2016/0336785 A1 | 11/2016 | Gao et al. | |
| 2016/0342151 A1* | 11/2016 | Dey, IV | G06F 3/04842 |
| 2017/0133881 A1 | 5/2017 | Cho et al. | |
| 2017/0163076 A1 | 6/2017 | Park et al. | |
| 2017/0170678 A1 | 6/2017 | Uhm | |
| 2017/0294807 A1 | 10/2017 | Van Den Brink et al. | |
| 2018/0278740 A1* | 9/2018 | Choi | G06F 3/04847 |
| 2019/0025891 A1 | 1/2019 | Kim et al. | |
| 2019/0052100 A1 | 2/2019 | Lim et al. | |
| 2019/0165613 A1 | 5/2019 | Jung et al. | |
| 2019/0318616 A1* | 10/2019 | Matson | H04L 67/306 |

FOREIGN PATENT DOCUMENTS

| | | |
|---|---|---|
| JP | 2018-093718 | 6/2018 |
| KR | 10-2010-0012944 | 2/2010 |
| KR | 10-2014-0124702 | 10/2014 |
| KR | 10-2016-0052233 | 5/2016 |
| KR | 10-2016-0061228 | 5/2016 |
| KR | 10-2016-0077695 | 7/2016 |
| KR | 10-2017-0005687 | 1/2017 |
| KR | 10-2017-0008438 | 1/2017 |
| KR | 10-2017-0022115 | 3/2017 |
| KR | 10-2017-0054944 | 5/2017 |
| KR | 10-2017-0065228 | 6/2017 |
| KR | 10-2017-0068282 | 6/2017 |
| KR | 10-2017-0091915 | 8/2017 |
| WO | WO 2009/132425 | 11/2009 |

OTHER PUBLICATIONS

Trewus James: "Fulton Innovation Launches eCoupled Technology for Bi-Directional Wireless Charging (hands on) Engadget", XP055844474, Aug. 1, 2013, 8 pages.
European Search Report dated Oct. 5, 2021 issued in counterpart application No. 19874062.3-1216, 15 pages.
Indian Examination Report dated Dec. 9, 2022 issued in counterpart application No. 202137016116, 5 pages.

* cited by examiner

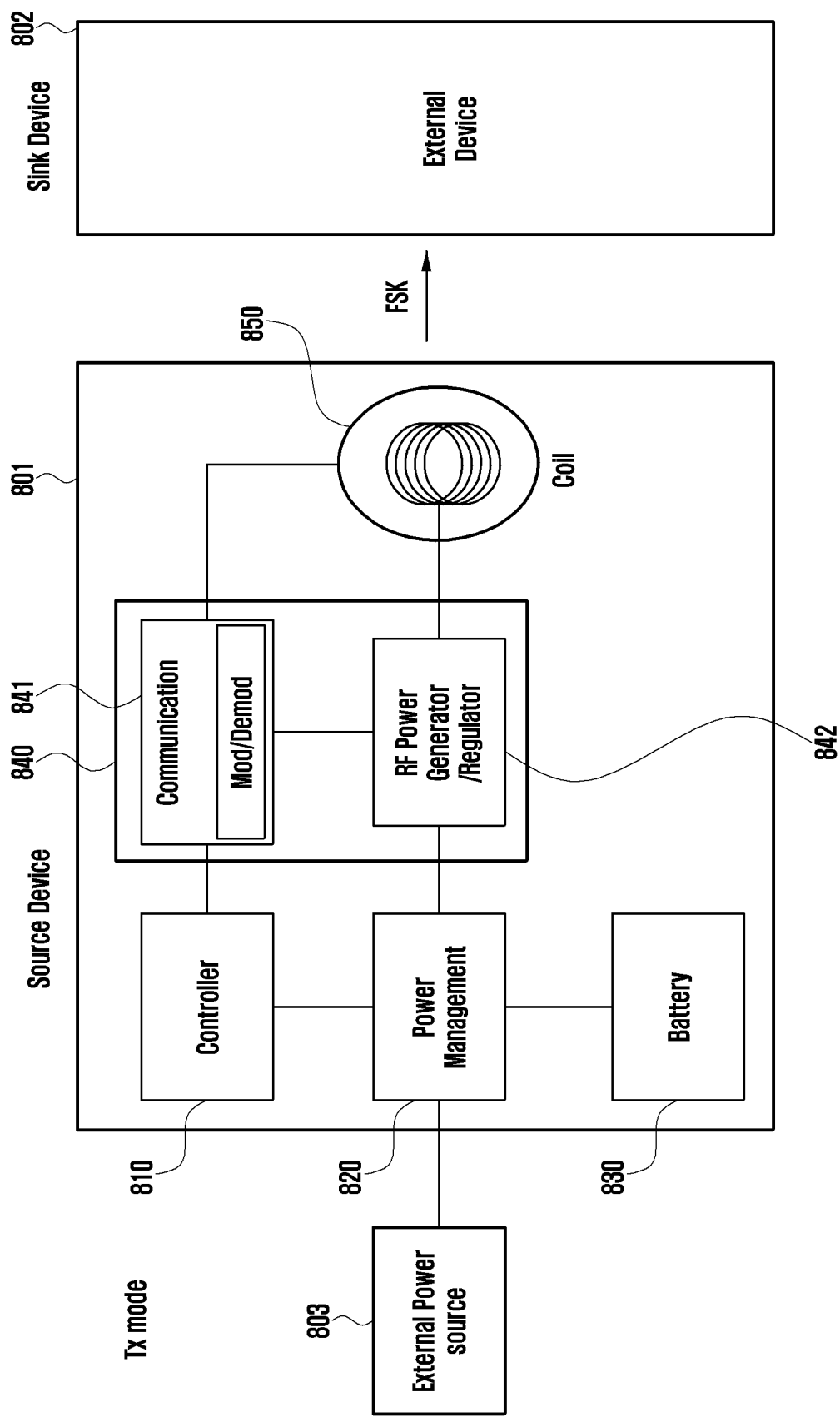

ELECTRONIC DEVICE AND METHOD FOR WIRED AND WIRELESS CHARGING IN ELECTRONIC DEVICE

CROSS-REFERENCE TO RELATED APPLICATION(S)

This application is a Continuation of U.S. Patent Application No. 16/653,443 filed on Oct. 15, 2019, based on and claiming priority under 35 U.S.C. § 119 to Korean Patent Application No. 10-2018-0122641, filed on Oct. 15, 2018, the disclosure of each of which is incorporated by reference herein in its entirety.

BACKGROUND

1) Field

The disclosure relates generally to an electronic device and a method for wired and wireless charging in an electronic device.

2) Description of Related Art

Electronic devices may be charged by wire and/or wirelessly.

For example, a conventional electronic device may be supplied with electric power by wire from a wired charging device to charge a battery when the wired charging device is connected to the electronic device, and may cause a current to flow through a coil in a magnetic induction scheme to charge the battery when a wireless charging device is connected to the electronic device.

In a conventional electronic device, a charging circuit of a battery is configured simply to receive a charging current from a wired charging device to charge the battery or charge the battery from an induction current generated by a wireless charging device, but electric power of the battery cannot be supplied to an external device.

SUMMARY

An aspect of the disclosure provides an electronic device and a method capable of transmitting electric power stored in a battery to an external device.

According to an aspect of the disclosure, an portable terminal is provided that includes a battery, a power management circuit electrically connected to the battery, a coil, a communication circuit electrically connected with the coil, a wireless charging circuit electrically connected with the coil, and a controller operatively connected with the power management circuit, the communication circuit and the wireless charging circuit, with the controller being configured to: identify whether the portable terminal is set to function as a wireless power transmitter or as a wireless power receiver; based at least in part on the portable terminal being set to function as the wireless power receiver, control the wireless charging circuit to receive a first wireless power signal from a first external electronic device through the coil, control the power management circuit to charge the battery using the first wireless power signal received from the first external electronic device, and control the communication circuit to transmit, through the coil, to the first external electronic device a first parameter corresponding to a wireless power receiver function; and based at least in part on the portable terminal being set to function as the wireless power transmitter, control the wireless charging circuit to transmit a second wireless power signal to the first external electronic device or a second external electronic device through the coil, control the power management circuit to supply power to the wireless charging circuit, and control the communication circuit to transmit, through the coil, to the first external electronic device or the second external electronic device a second parameter corresponding to a wireless power transmitter function. The wireless charging circuit is configured to modulate, using the communication circuit, the first parameter with a first modulation scheme before the first parameter is transmitted to the first external electronic device; and modulate, using the communication circuit, the second parameter with a second modulation scheme different from the first modulation scheme before the second parameter is transmitted to the first external electronic device or the second external electronic device.

According to another aspect of the disclosure, a method of a portable terminal is provided that includes identifying whether the portable terminal is set to function as a wireless power transmitter or as a wireless power receiver; based at least in part on the portable terminal being set to function as the wireless power receiver, controlling a wireless charging circuit to receive a first wireless power signal from a first external electronic device through a coil, controlling a power management circuit to charge the battery using the first wireless power signal received from the first external electronic device, and controlling a communication circuit to transmit, through the coil, to the first external electronic device a first parameter corresponding to a wireless power receiver function; and based at least in part on the portable terminal being set to function as the wireless power transmitter, controlling the wireless charging circuit to transmit a second wireless power signal to the first external electronic device or a second external electronic device through the coil, controlling the power management circuit to supply power to the wireless charging circuit, and controlling the communication circuit to transmit, through the coil, to the first external electronic device or the second external electronic device a second parameter corresponding to a wireless power transmitter function; modulating, using the communication circuit, the first parameter with a first modulation scheme before the first parameter is transmitted to the first external electronic device; and modulating, using the communication circuit, the second parameter with a second modulation scheme different from the first modulation scheme before the second parameter is transmitted to the first external electronic device or the second external electronic device.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 is a block diagram of a wireless power circuit of an electronic device in a Tx mode according to an embodiment;

DETAILED DESCRIPTION

Figure 1:
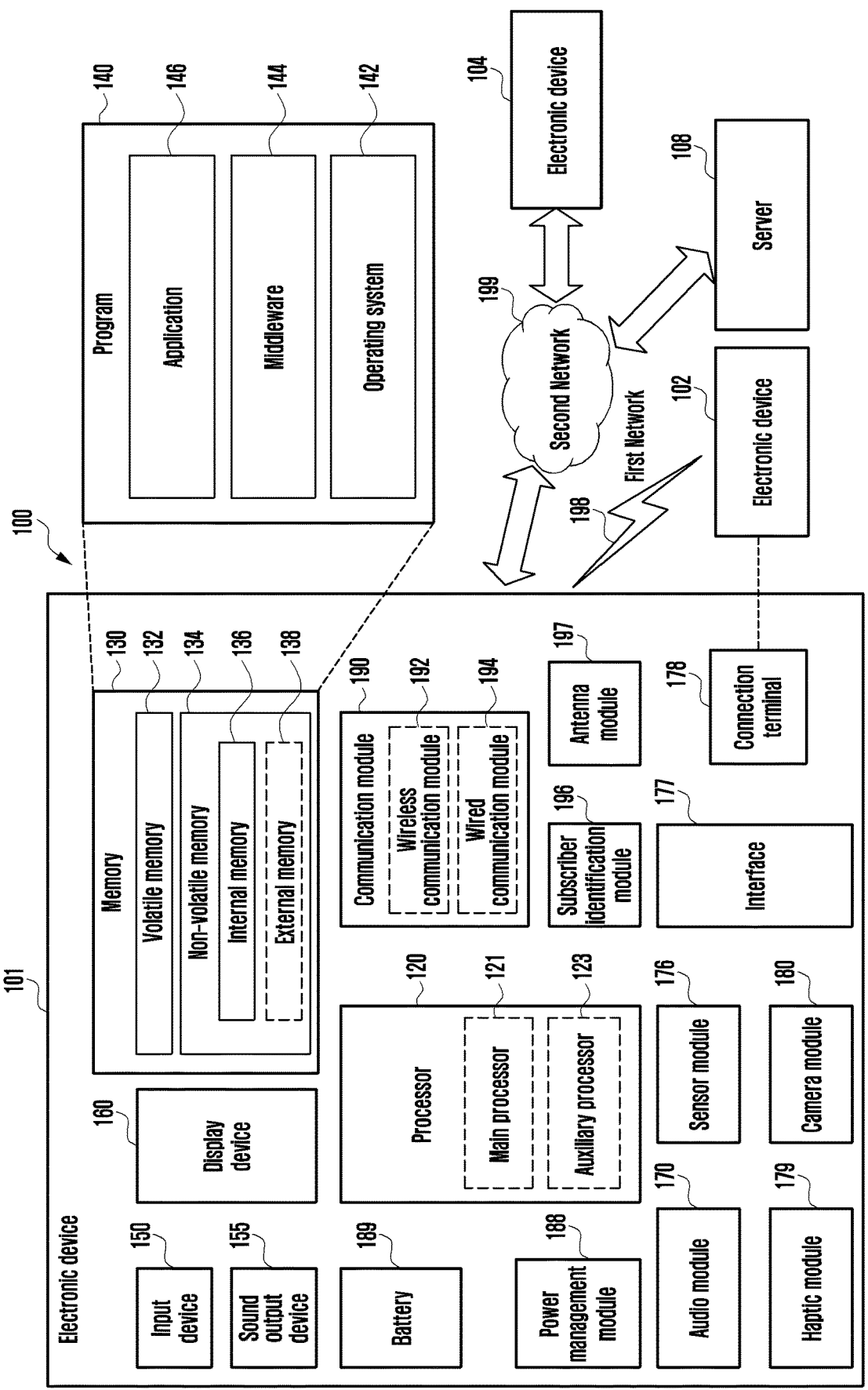
FIG. 1 is a block diagram of an electronic device in a network environment according to an embodiment.

FIG. 1 is a block diagram of an electronic device 101 in a network environment 100 according to an embodiment.

Referring to FIG. 1, the electronic device 101 in the network environment 100 may communicate with an electronic device 102 via a first network 198 (e.g., a short-range wireless communication network) or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, a sound output device 155, a display device 160, an audio module 170, a sensor module 176, an interface 177, a connection terminal 178, a haptic module 179, a camera module 180, a power management module 188, a battery 189, a communication module 190, a subscriber identification module (SIM) 196, and an antenna module 197. At least one (e.g., the display device 160 or the camera module 180) of the components may be omitted from the electronic device 101 or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute software (e.g., a program 140) to control at least one other component (e.g., a hardware or a software component) of the electronic device 101 coupled with the processor 120, and may perform various data processing or a computation. As at least part of the data processing or the computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 includes a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include software (e.g., the program 140) and input data or output data for a command related thereto. The memory 130 may include the volatile memory 132 or the non-volatile memory 134.

The program 140 may be stored in the memory 130 as software, and includes, for example, an operating system (OS) 142, middleware 144, and an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or a record, and the receiver may be used for incoming calls. The receiver may be implemented as separate from, or as part of, the speaker.

The display device 160 may visually provide information to the outside (e.g., a user) of the electronic device 101. The display device 160 may include, for example, a display, a hologram device, or a projector and control circuitry to control a corresponding one of the display, the hologram device, and the projector. The display device 160 may include touch circuitry adapted to detect a touch, or sensor circuitry (e.g., a pressure sensor) adapted to measure an intensity of a force incurred by the touch.

The audio module 170 may convert a sound into an electrical signal and vice versa. The audio module 170 may obtain a sound via the input device 150, or output a sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). The connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via a tactile sensation or a kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a PMIC.

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the electronic device 102, the electronic device 104, or the server 108 and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, a global navigation satellite system (GNSS) communication module), or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or a standard of the Infrared Data Association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single integrated circuit (IC) or chip), or may be implemented as multi components (e.g., multi chips) separate from each other. The wireless communication module 192 may identify and authenticate the electronic device 101 in a communication network, such as the first network 198 or the second network 199, using subscriber information (e.g., an international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type from, the electronic device 101. All or some of operations to be executed at the electronic device 101 may be executed at one or more of the external electronic device 102, the electronic device 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer the outcome to the electronic device 101. The electronic device 101 may provide the outcome, with or without further processing of the outcome, as at least part of a reply to the request. To that end, a cloud computing, a distributed computing, or a client-server computing technology may be used, for example.

Figure 2:
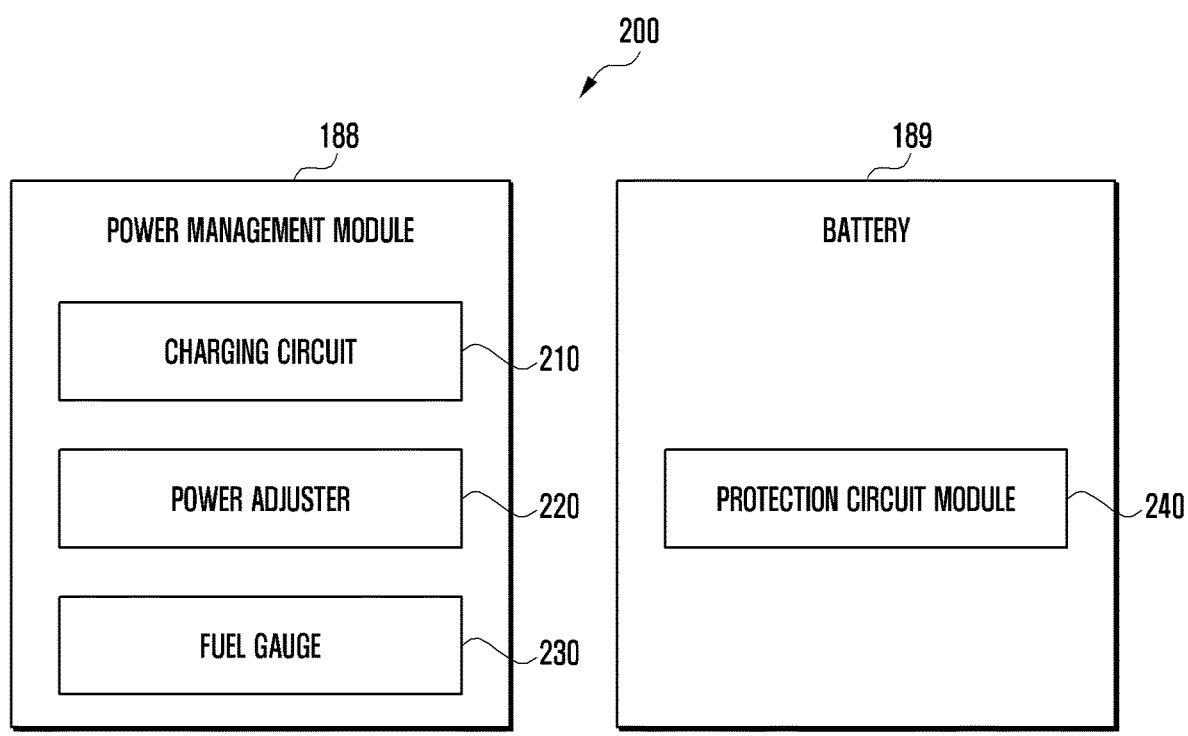
FIG. 2 is a block diagram of a power management module and a battery according to an embodiment.

FIG. 2 is a block diagram 200 illustrating the power management module 188 and the battery 189 according to an embodiment.

Referring to FIG. 2, the power management module 188 includes charging circuitry 210, a power adjuster 220, and a power gauge (or fuel gauge) 230. The charging circuitry 210 may charge the battery 189 by using power supplied from an external power source outside the electronic device 101. The charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watts or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. The power adjuster 220 may be implemented in the form of a low drop out (LDO) regulator or a switching regulator. The fuel gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the fuel gauge 230, charging state information (e.g., lifetime, over voltage, low voltage, over current, over charge, over discharge, overheat, short circuit or short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to be abnormal, the power management module 188 may adjust the charging of the battery 189 (e.g., reduce the charging current or voltage, or stop the charging). At least some of the functions of the power management module 188 may be performed by an external control device (e.g., the processor 120).

The battery 189 includes a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

At least part of the charging state information or use state information regarding the battery 189 may be measured using a corresponding sensor (e.g., a temperature sensor) of the sensor module 176, the fuel gauge 230, or the power management module 188. The corresponding sensor (e.g., a temperature sensor) of the sensor module 176 may be included as part of the PCM 240, or may be disposed near the battery 189 as a separate device.

An electronic device (e.g., an electronic device 801 of FIG. 8) according to an embodiment of the disclosure may include a battery (e.g., a battery 830 of FIG. 8), a PMIC (e.g., a PMIC 820 of FIG. 8) configured to control a charging status of the battery 830, a coil (e.g., a coil 850 of FIG. 8), a wireless power circuit (e.g., a wireless charging IC 840 of FIG. 8) electrically connected to the coil 850, a communication circuit (e.g., a communication circuit 841 of FIG. 8) electrically connected to the coil (e.g., the coil 850 of FIG. 8), and a processor (e.g., a controller 810 of FIG. 8), wherein the controller 810 is configured to, when the wireless charging IC 840 is in a Tx mode, transmit a wireless power signal through the coil 850 by using the wireless charging IC 840, and transmit a signal obtained by FSK-modulating a transmission device parameter by using the communication circuit 841, to an external electronic device 802 through the coil 850, and, when the wireless charging IC 840 is in an Rx mode, receive wireless power by using the wireless charging IC 840 to charge the battery 830, and transmit a signal obtained by ASK-modulating a reception device parameter by using the communication circuit 841, to the external electronic device 802 through the coil 850. The wireless power signal may be a wireless signal of a band of 110 kHz to 190 kHz. The controller 810 may be configured to, when the wireless charging IC 840 is in the Tx mode, FSK-modulate the transmission device parameter to a signal of a band of around Δ0.2% to 5% as compared with the band of the wireless power signal, by using the communication circuit 841. The controller 810 may be configured to, when the wireless charging IC 840 is in Tx mode, set a depth including a scaling factor to 0, and FSK-modulate the transmission device parameter to a signal of a band around Δ0.3% as compared with the band of the wireless power signal. The controller 810 may be configured to, when the wireless power circuit is in Tx mode, set a depth including a scaling factor to 3, and FSK-modulate the transmission device parameter to a signal of a band around Δ3.2% as compared with the band of the wireless power signal. The transmission device parameter may include at least one of identification information on the electronic device 801, information on the battery 830, information on a travel adapter (TA) connected to the electronic device 801, information on electric power which is supplied based on the information on the battery 830 and the information on the TA, or information on a transmission mode. The controller 810 may be configured to, when the wireless charging IC 840 is in the Tx mode, receive a response signal on a signal obtained by modulating the transmission device parameter, from the external electronic device 802, and transmit a specific wireless power signal determined based on the response signal, through the coil 850. The controller 810 may be configured to, when the wireless charging IC 840 is in the Rx mode, ASK-modulate the reception device parameter to a signal having a voltage change of Δ1% to 30% as compared with the voltage of the received wireless power, by using the communication circuit 841, The reception device parameter may include at least one of information on a request for change of a charging mode (a voltage, a current, electric power), identification information on the electronic device 801, information on electric power that may be received, information on a state of received electric power, or information on the battery 830.

Figure 3A:
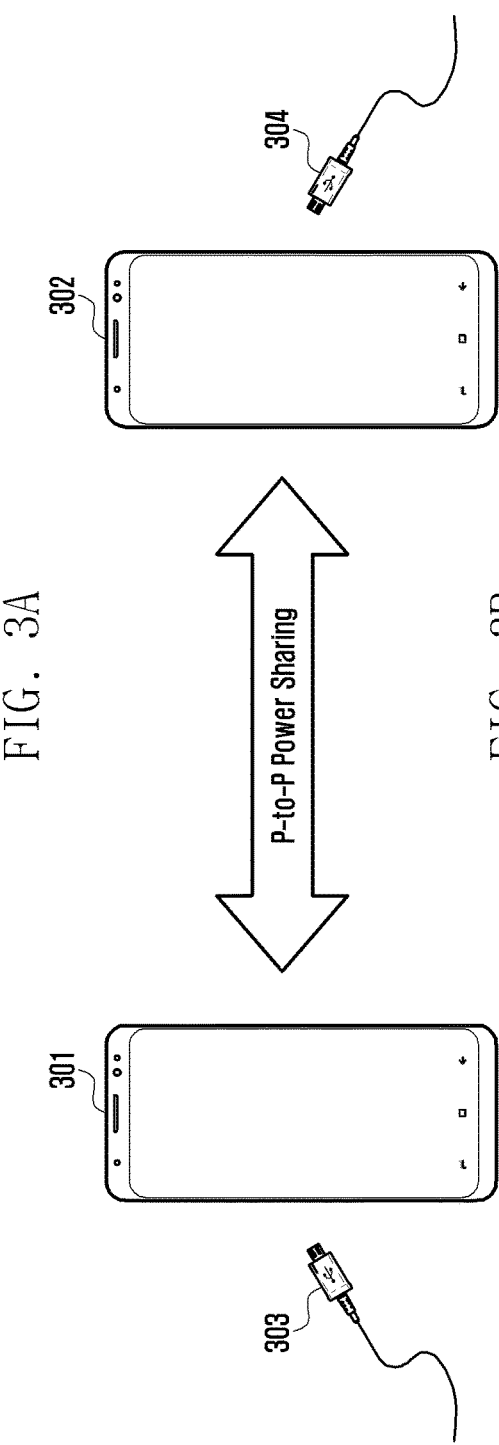
FIGS. 3A and 3B are an illustration and a block diagram of wirelessly sharing electric power between a first electronic device and a second electronic device according to an embodiment.
Figure 3B:
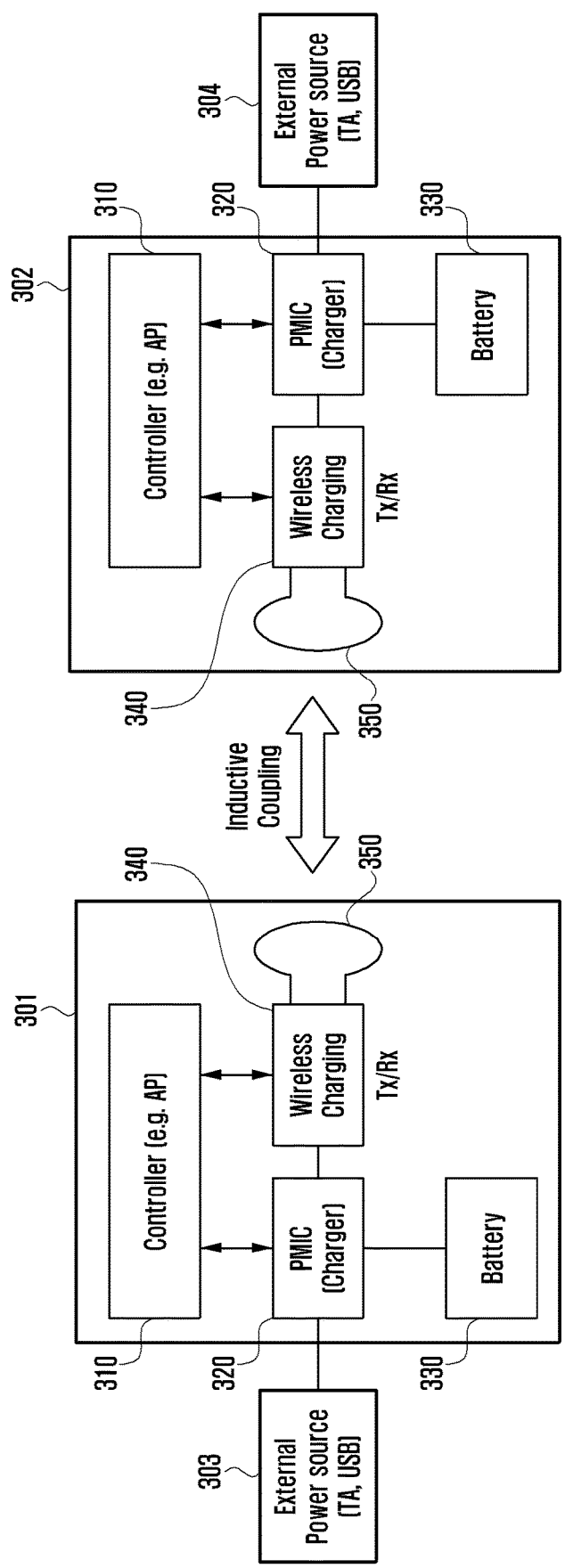

Various embodiments of the disclosure may relate to a method for sharing (transmitting) electric power between electronic devices by using a wireless power transmission technology. The electronic device may adjust transmission power by controlling a charging circuit based on charging electric energy of an external electronic device that receives wireless power. The electronic device can transmit electric power to an external electronic device (e.g., a smartphone) that requires relatively high power during wireless charging or can transmit electric power to the external electronic device (e.g., a wearable device) that requires relatively low power during wireless charging, and may adjust transmission power based on the kind of the external electronic device. FIGS. 3A and 3B are an illustration and a block diagram of wirelessly sharing electric power between a first electronic device and a second electronic device according to an embodiment.

Referring to FIGS. 3A and 3B, although both of a first electronic device 301 (e.g., the electronic device 101 of FIG.

1) and a second electronic device 302 (e.g., the electronic device 102 of FIG. 1) may be devices that may wirelessly transmit and receive electric power, one of the two electronic devices may be an electronic device that can only receive wireless power. In the disclosure, a description is provided with reference to the first electronic device 310 and the second electronic device 302 is described as an external electronic device, but the second electronic device 302 may have the same configuration as that of the first electronic device 301 or a configuration in which only a wireless power transmission function is removed.

The first electronic device 301 may include a coil 350, a wireless charging IC 340, a PMIC 320 (e.g., a power management module 188 of FIG. 2), a battery 330 (e.g., a battery 189 of FIG. 1), an external power source 303 (e.g., a USB), and/or a controller 310 (e.g., a processor 120 of FIG. 1), The coil 350 may be spirally formed in a flexible PCB (FPCB).

The wireless charging IC 340 may include a full bridge circuit. For example, the wireless charging IC 340 may perform a control such that a full bridge circuit is driven as an inverter (DC→AC) in a wireless power transmission operation, and may perform a control such that the full bridge circuit is driven as a rectifier (AC→DC) in a wireless power receiving operation.

The wireless charging IC 340 may exchange information, which is necessary for wireless power transmission, through in-band communication with the second electronic device 302 according to at least some of the Wireless Power Consortium (WPC) standards (or non-standards). For example, the in-band communication may be a scheme in which data may be exchanged between the first electronic device 301 and the second electronic device 302 through frequency or amplitude modulation of a wireless power transmission signal in a situation of transmitting wireless power between the coils 350. The communication between the first electronic device 301 and the second electronic device 302 may be out-band communication. For example, the out-band communication is different from a wireless power signal, and may be short-range communication such as near field communication (NFC), Bluetooth, or Wi-Fi.

The PMIC 320 may include a charger function of charging wired and wireless input power in the battery 330, a function of communicating (e.g., a USB battery charging spec, USB power delivery (PD) communication, adaptive fast charge (AFC) communication, and/or quick charge (QC) communication) with an external power source device (e.g., a TA) connected to a USB terminal, a function of supplying necessary electric power to a system or supplying electric power that is suitable for voltage levels that are necessary for the elements, and/or a function of supplying electric power to the wireless charging IC 340 in the wireless power transmission mode.

The external power sources 303 and 304 may be terminals that follow the USB standards. For example, the external power sources 303 and 304 may be interfaces for USB charging and/or on-the-go (OTG) power supply. An external power source (a TA or a battery pack) may be connected to the external power sources 303 and 304.

The controller 310 may control wired/wireless charging of the first electronic device and USB communication with the second electronic device 302, and/or communication (e.g., USB PD, USB battery charging revision 1.2 (BC1.2), AFC, and/or QC) with the second electronic device 302 in an integrated way according to the situation of the first electronic device 301. For example, BC1.2 or PD may be an interface that communicates with an external power source (e.g., the TA), and the controller 310 may control communication with the external power source. For example, the situation of the first electronic device 301 may include the temperature of the first electronic device 301 and/or the capacity of the battery 330 of the first electronic device 301.

The first electronic device 301 may be operated in a wireless power Tx mode by using the battery 330. The first electronic device 301 may charge power that is left after external power is utilized first in the Tx mode, in the battery 330, when the wired power supplying device is connected to the first electronic device 301. When the wired power supplying device is connected to the first electronic device 301, the first electronic device 301 may supply external power (e.g., electric power) to the wireless charging IC 340, and may supply at least a portion of the remaining power (e.g., electric power) to the battery 330.

Herein, the state in which the electronic device (e.g., the first electronic device 301 of FIG. 3) is operated in a wireless power Tx mode may indicate a state in which the electronic device wirelessly transmits electric power to an external electronic device (e.g., the second electronic device 302 of FIG. 3) by using the coil 350. The state in which the electronic device 301 is operated in a wireless power Rx mode may indicate a state in which the electronic device 301 wirelessly receives electric power from the external electronic device (e.g., the second electronic device 302 of FIG. 3) through the coil 350, and changes the battery 330 by using the wirelessly received power.

Figure 4:
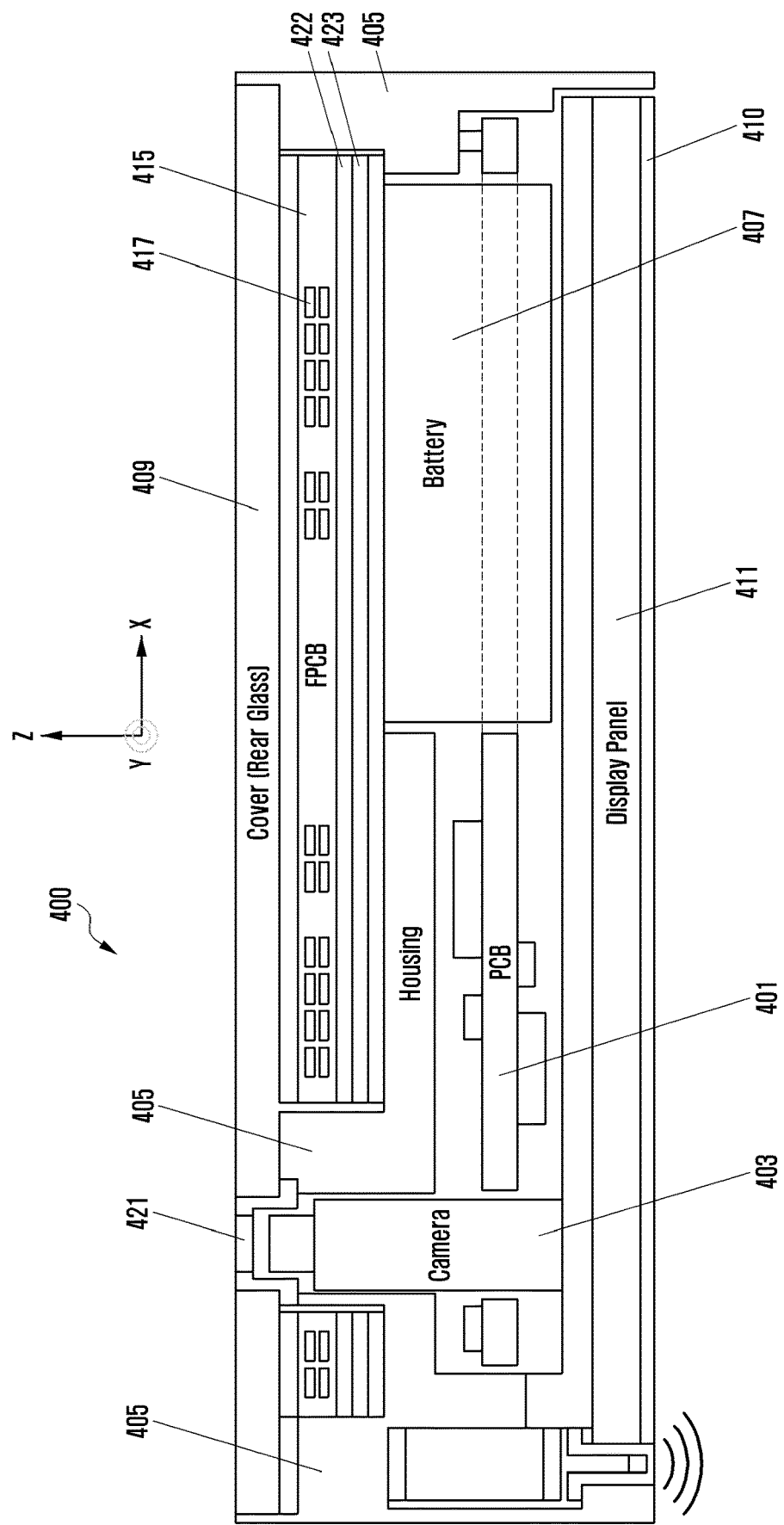
FIG. 4 is a cross-sectional view of an electronic device according to an embodiment.

FIG. 4 is a cross-sectional view of an electronic device 400 according to an embodiment.

Referring to FIG. 4, the electronic device 400 (e.g., the electronic device 101 of FIG. 1) includes a housing 405 that accommodates and fixes one or more parts, or a cover 409 coupled to the housing 405 on a rear surface of the electronic device 400. For example, the parts include a display panel 411, a board 401, a battery 407 (e.g., a first battery 189 of FIG. 1), a camera 403, and an FPCB 415, which are located in the interior of the housing 405.

The display panel 411 may be located on the front surface of the electronic device, and a glass (a window cover) 410 may be attached to the upper surface of the display panel 411. The display panel 411 may be integrally formed with a touch sensor or a pressure sensor. The touch sensor or the pressure sensor may be separated from the display panel 411. For example, the touch sensor may be located between the glass 410 and the display panel 411.

Parts, such as a communication module (e.g., the communication module 190 of FIG. 1) or a processor (e.g., the processor 120 of FIG. 1) may be mounted on the board 401. The board 401 may be realized by using at least one of a PCB or an FPCB. The board 401 may be operated as a ground plate that may ground a loop antenna 417.

The cover 409 may be divided into a conductive area including a conductive material and a nonconductive area including a nonconductive material. For example, the cover 409 may be divided into a conductive area, and a nonconductive area located on one side or opposite sides of the conductive area. One or more openings 421 for exposing some parts of the electronic device 400 to the outside may be formed in the cover 409. For example, the cover 409 may include one or more openings 421 for exposing a camera 403, a flash, or a sensor (e.g., a fingerprint sensor).

The FPCB 415 may be attached to a lower surface of the cover 409. One or more loop antennas 417 may be mounted on the FPCB 415, and the FPCB 415 may be located to be electrically insulated from the conductive area of the cover 409.

The one or more loop antennas 417 may be formed in the same type. For example, the one or more loop antennas 417 may be formed of planar coils. Some of the one or more loop antennas 417 may be formed of planar coils, and the others may be formed of solenoid type coils.

The one or more loop antennas 417 may include wireless charging coils, and the wireless charging coils may have spiral patterns.

Magnetic field shielding layers (a shielding sheet 422 and a graphite sheet 423) may be formed on one side of the one or more loop antennas 417. For example, the magnetic field shielding layers 422 and 423 can prevent abnormal operations of the other electronic parts by concentrating the direction of the magnetic field generated from the coil on the rear side (e.g., the Z direction of FIG. 4) of the electronic device 400 and restraining formation of the magnetic field in the interior of the electronic device 400.

Figure 5:
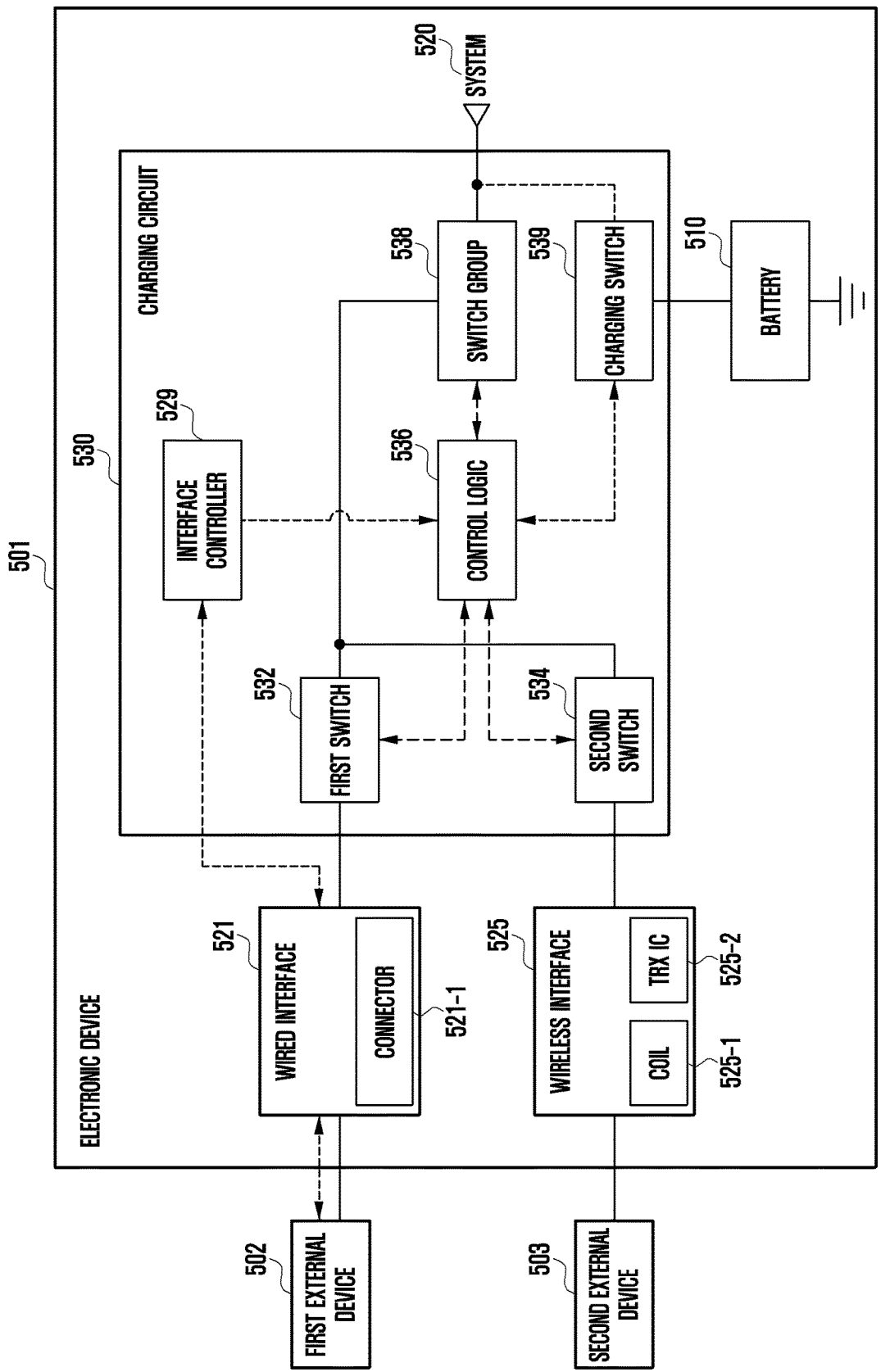
FIG. 5 is a block diagram a charging circuit in an electronic device according to an embodiment.

FIG. 5 is a block diagram of a charging circuit 530 in an electronic device 501 according to an embodiment.

Referring to FIG. 5, the electronic device 501 (e.g., the electronic device 101 of FIG. 1) includes a battery 510 (e.g., the battery 189 of FIG. 1), a wired interface 521, a wireless interface 525, and the charging circuit 530.

The battery 510 may be mounted in the housing (e.g., the housing 405 of FIG. 4) of the electronic device 501, and may be charged. The battery 510, for example, may include a lithium-ion battery, a rechargeable battery, and/or a solar battery.

The wired interface 521 and the wireless interface 525 may be mounted on portions of the housing of the electronic device 501, and may be connected to a first external device 502 and a second external device 503, respectively. The wired interface 521, for example, may include a USB connector 521-1, may be connected to the first external device 502 through the connector 521-1, and may be an interface for USB charging and/or an OTG power supply, or an external power source (a TA, a battery pack, or the like) may be connected to the wired interface 521. The wireless interface 525 may include a coil 525-1 (e.g., a conductive pattern) (e.g., one or more loop antenna 417 of FIG. 4) and a transmission/reception integrated chip (TRX IC) 525-2, and may wirelessly transmit and receive electric power to and from the second external device 503 through the conductive pattern 525-1 and the TRX IC 525-2. In wireless power transmission, electric power may be transmitted and received by using a wireless power transmission scheme, such as a magnetic field induction coupling scheme, a resonance coupling scheme, or a combination thereof. The conductive pattern 525-1 may include a first conductive pattern for wirelessly transmitting electric power, and a second conductive pattern for wirelessly receiving electric power, The first external device 502 may be an external device that may be connected in a wired scheme, and may be a wired power supplying device or a wired power receiving device. The wired power receiving device may be an OTG device. The OTG device may be a device, such as a mouse, a keyboard, a USB memory, and an accessory, which is connected to the electronic device to receive electric power. Then, the electronic device may be operated in an OTG mode for supplying external electric power to the USB terminal. The wired power supplying device may be a device, such as a TA, which is connected to the electronic device by wire to supply electric power to the electronic device. The wired power receiving device may be connected to the electronic device 501 by wire to receive electric power from the electronic device 501 to be used as an internal power source, and may charge another battery provided in the wired power receiving device. The first external device connected to the electronic device 501 through the wired interface 521 may include a wired high-voltage (HV) device (e.g., a device that assists AFC or QC. When the wired HV device is connected to the connector, electric power of a voltage (e.g., 9 V) that is higher than a voltage (e.g., 5 V) supplied from the battery 510 may be supplied to, or received from, the wired HV device.

The second external device 503 may include a wireless power supplying device or a wireless power receiving device. The wireless power supplying device may be a device, such as a wireless charging pad, which wirelessly supplies electric power to the electronic device 501 by using the first conductive pattern. The wireless power receiving device may be a device that may wirelessly receive electric power supplied from the electronic device 501, by using the second conductive pattern, and charges the received electric power in another battery included in the wireless power receiving device. The second external device 503 connected to the electronic device 501 through the wireless interface 525 may include a wireless HV device (e.g., a device that assists AFC or QC. The wireless HV device may include a wireless charging pad that assists QC. The wireless charging pad may determine whether QC will be performed, by communicating with the TRX IC 525-2 through in-band communication, or may determine whether QC will be performed, by using a separate communication module (Bluetooth or ZigBee). For example, the electronic device 501 may request charging of a high voltage of 9 V, from the wireless charging pad through the TRX IC 525-2, and may identify whether QC is possible, through communication with the electronic device 501 according to the request for HV charging by the electronic device 501. If it is identified that QC is possible, the wireless charging pad may supply electric power of 9V to the electronic device 501.

The charging circuit 530 may be electrically connected to the battery 510, and may be configured to electrically connect the wired interface 521 and the wireless interface 525, the battery 510 and the wired interface 521, and the battery 510 and the wireless interface 525. The charging circuit 530 may be configured to electrically connect the battery 510 and the conductive pattern (e.g., the first conductive pattern) to wirelessly transmit electric power to the second external device 503 (e.g., the wireless power receiving device), and to electrically connect the battery 510 and the connector 521-1 to transmit electric power to the first external device 502 (e.g., the wired power receiving device) by wire while wirelessly transmitting electric power to the outside. For example, the charging circuit 530 may change a first power generated by the battery 510 to a second power that is greater than the first power, and may transmit a third power that is at least a portion of the second power to the wireless power receiving device through the first conductive pattern and may transmit a fourth power that is at least a portion of the second power to the OTG device or the wired power receiving device through the connector 521-1.

The charging circuit 530 may include an interface controller 529, a first switch 532, a second switch 534, a control logic 536, a switch group 538, and/or a charging switch 539.

The interface controller 529 may determine the kind of the first external device 502 connected to the wired interface 521, and may determine whether QC is assisted through AFC communication with the first external device 502. The interface controller 529 may include a micro USB interface IC (MUIC) or quick charging (e.g., AFC or QC) interface. For example, the MUIC may determine whether the first external device 502 connected to the wired interface 521 is a wired power supplying device or a wired power receiving device. For example, the QC interface may determine whether QC is assisted through communication with the first external device 502. When QC is assisted, the first external device 502 may increase transmitted/received electric power. For example, if QC is assisted when the first external device 502 is a wired power supplying device that generally transmits electric power of 10 W (5 V/2 A), electric power of 15 W (9 V/1.6 A) may be transmitted.

The first switch 532 may include one or more switches, and may control an output of electric power to a device (e.g., the OTG device) connected through the wired interface 521 or the wired power receiving device, and an input of electric power from the wired power supplying device. For example, the first switch 532 may be operated in an on state such that electric power is output to the OTG device or the wired power receiving device and electric power is input from the wired power supplying device, and may be operated in an off state such that electric power is not output to the OTG device or the wired power receiving device and electric power is not input from the wired power supplying device.

The second switch 534 may include one or more switches, and may control an input and an output of electric power to and from the wireless power supplying device and the wireless power receiving device through the wireless interface 525, for example, the conductive pattern 525-1 and the TRX IC 525-2. For example, the second switch 534 may be operated in an on state such that electric power may be input and output to and from the wireless power supplying device or the wireless power receiving device, or may be operated in an off state such that electric power may be neither input nor output to and from the wireless power supplying device or the wireless power receiving device.

The control logic 536 may perform a control such that the electric power input from at least one of the first switch 532 and the second switch 534 is converted to a charging voltage and a charging current that are suitable for charging of the battery 510, a control such that the electric power from the battery 510 is converted to a charging voltage and a charging current that are suitable for charging of other batteries of the external devices connected to the first switch 532 and the second switch 534, respectively, and a control such that the electric power from the battery 510 is converted to a voltage and a current that are suitable for being used in the external device.

The control logic 536 may perform a control such that the charging circuit 530 transmits power by the battery 510 to the outside selectively wirelessly or by wire. The control logic 536 may perform a control such that the electric power is transmitted to the first external device 502 and/or the second external device 503 through the charging circuit 530, or the electric power is received from the first external device 502 and/or the second external device 503.

The control logic 536 may perform a control such that the battery 510 is charged by using the electric power received from the wired power supplying device when the wired power supplying device is connected. The control logic 536 may perform a control such that an OTG function is performed when the OTG device is connected. The control logic 536 may perform a control such that the battery 510 is charged by receiving electric power from the wireless power supplying device when the wired power supplying device is connected. The control logic 536 may perform a control such that the battery 510 is charged by receiving the electric power from the wireless power supplying device and the OTG function is performed as well when the wireless power supplying device is connected to the OTG device. The control logic 536 may perform a control such that electric power is supplied to the wireless power receiving device by using the electric power of the battery 510 when the wireless power receiving device is connected. The control logic 536 may perform a control such that the battery 510 is charged and the wireless power receiving device is supplied with electric power as well by receiving electric power from the wired power supplying device when the wired power supplying device and the wireless power receiving device are connected to each other. The control logic 536 may perform a control such that the OTG function is performed and electric power is supplied to the wireless power receiving device by using the electric power of the battery as well when the OTG device and the wireless power receiving device are connected to each other.

The switch group 528 may boost (↑) or buck (↓) the voltage of the battery 510 to provide a constant current to the system (e.g., the system 520 that supplies electric power to the modules of the electronic device 501) or provide a constant current to the connected external device, or may boost (↑) or buck (↓) the charging voltage provided to provide a charging current to the battery 510. The switch group 528 may include a buck/boost converter.

The charging switch 539 may detect an amount of charging currents, and may stop charging of the battery 510 during overcharging or overheating.

The electronic device 501 may include a display (e.g., the display device 160 of FIG. 1). The display 160 may display a user interface configured to control at least a portion of the charging circuit 530. The display 160 may receive a user input that causes electric power from the battery 510 to be transmitted to the external device wirelessly or by wire. The display 160 may display one or more external devices connected to the electronic device 501, may display the residual power level of the battery of the connected external device, or may display whether electric power is being supplied to the connected external device or electric power is being received from the connected external device. When a plurality of external devices are connected to the display 160 and electric power is provided to the plurality of external devices, a screen, through which distribution of electric power provided to the plurality of external devices may be adjusted, may be displayed, and a screen, through which a power provision priority of the plurality of external devices may be selected, may be displayed. The display 160 may display a screen that displays information on the display 160 of the connected external device. At least some of the contents displayed on the display 160 may be changed according to a signal received from the connected external device.

Figure 6A:
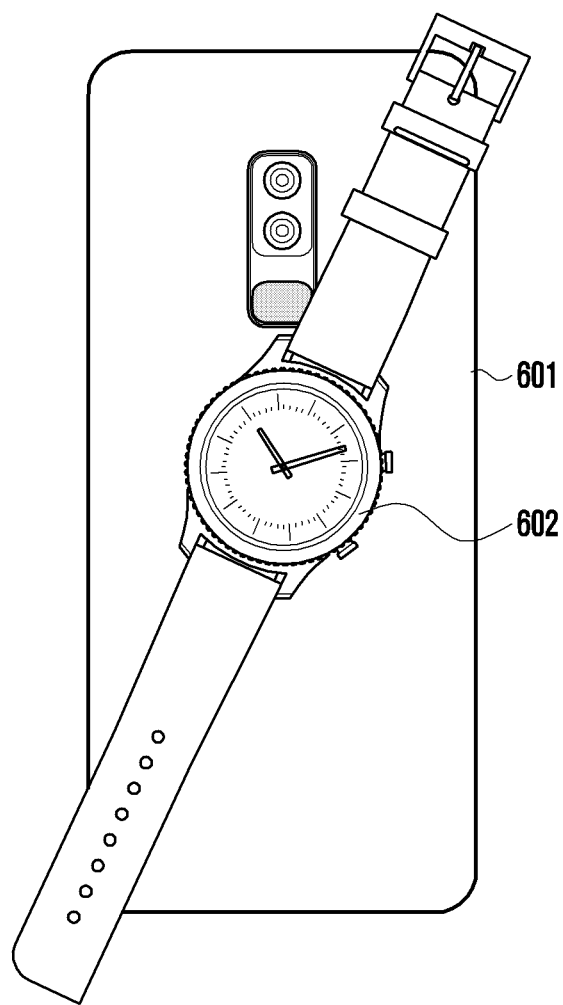
FIG. 6A is an illustration of wirelessly charging a wearable device by using a wireless charging function of an electronic device according to an embodiment.
Figure 6B:
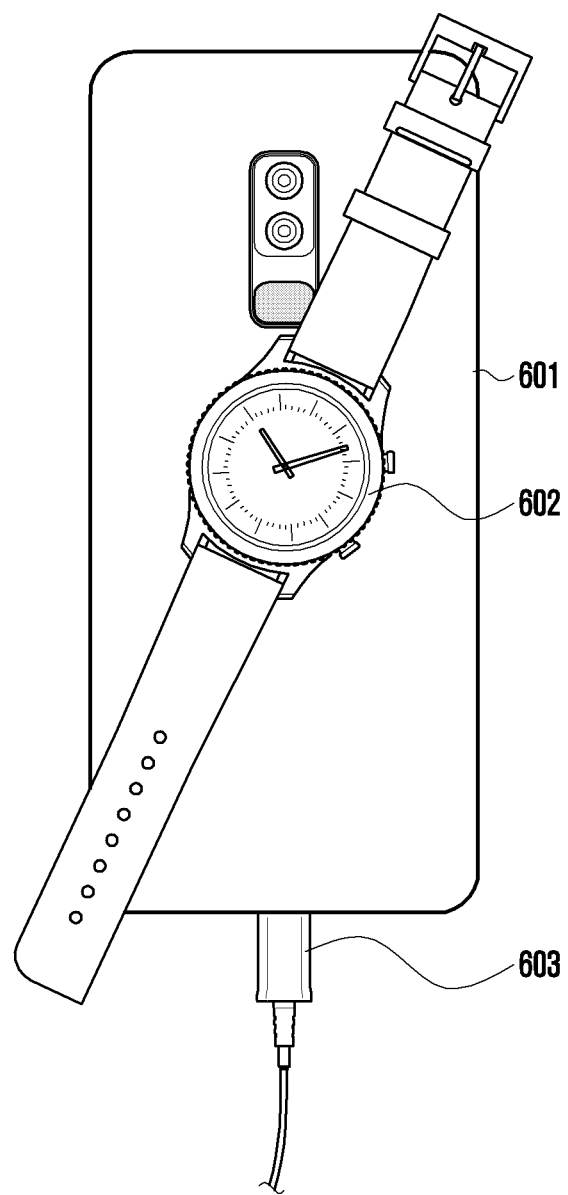
FIG. 6B is an illustration of wirelessly charging a wearable device by using a wireless charging function of an electronic device according to an embodiment.

FIG. 6A is an illustration of wirelessly charging a wearable device 602 by using a wireless charging function of an electronic device 601, and FIG. 6B is an example of a user scenario of wirelessly charging a wearable device 602 by using a wireless charging function of the electronic device 601. Although FIGS. 6A and 6B illustrate examples in which the wireless power receiving device 602 is a wearable device 602 (e.g., a smart watch, a wireless earphone, or a wireless headset), the wireless power receiving device 602 may be various electronic devices that may be wirelessly charged by receiving relatively low electric power (e.g., 5 V/3.75 W).

Referring to FIG. 6A, the electronic device 601 (e.g., the electronic device 101 of FIG. 1) may activate a wireless power Tx mode based on a user input, and may wirelessly supply electric power to the wearable device 602 by using electric power of the battery (e.g., the battery 510 of FIG. 5) if the wireless power Tx mode is activated. For example, the user input may include a touch input of a user through the display (e.g., the display device 160 of FIG. 1) or an operation of a physical button disposed outside the housing (e.g., the housing 405 of FIG. 4).

Referring to FIG. 6B, when a wired power supplying device 603 (e.g., a TA) is connected to the electronic device 601 according to an embodiment of the present disclosure, the electronic device 601 may receive electric power from the wired power supplying device 603 to supply electric power to the wearable device 602 and charge the battery 510 as well.

If the wireless power Tx mode is activated, the electronic device 601 may perform in-band communication with the external device 602 according to specific standards (e.g., WPC standards), and may exchange information that is necessary for wirelessly transmitting electric power to the external device 602. For example, wireless charging according to the WPC standards may include a ping operation, an identification/configuration operation, or a power transfer operation. The ping operation may be an operation of determining whether the wireless power receiving device (e.g., the wearable device 602 of FIG. 6A) is positioned on a wireless charging pad, and for example, may be an operation of determining whether the electronic device 601 is close to the external device 602 (e.g., the wearable device 602 of FIG. 6A). The identification/configuration operation may be an operation of setting an amount of transmission power through communication between the wireless power transmitting device (e.g., the electronic device 601 of FIG. 6A) and the wireless power receiving device (e.g., the wearable device 602 of FIG. 6A), and for example, may be an operation of determining electric power, which will be wirelessly transmitted to the external device 602, by the electronic device 601. The power transfer operation may be an operation of wirelessly transmitting the specific electric power, and for example, may be an operation of wirelessly transmitting specific electric power to the external device 602 by the electronic device 601. The electronic device 601 may wirelessly transmit electric power by performing the three operations if the wireless power Tx mode is activated, and may not perform the three operations if the wireless power Tx mode is not activated. The electronic device 601 may display a notification that indicates that the wireless power Tx mode is deactivated, through the display 160, if the Tx mode is deactivated.

If the wireless power Tx mode is activated, the electronic device 601 may identify the external device 602 according to specific standards (e.g., WPC standards), and may determine specific electric power corresponding to the identified external device 602. For example, the electronic device 601 may identify that the external device 602 is the wearable device 602, and may determine second specified power (e.g., 5 V/3.75 W) corresponding to the wearable device 602. The electronic device 601 may wirelessly transmit specific electric power by using an external power source provided from the wired power supplying device 603. For example, the electronic device 601 may FSK-modulate a transmission device parameter, and may transmit a signal obtained by FSK-modulating the transmission device parameter to the external device 602, together with a power signal. The electronic device 601 may receive a response to the signal obtained by FSK-modulating the transmission device parameter from the external device 602, and may determine specific electric power corresponding to the external device 602 at least based on the received response. The electronic device 601 may wirelessly transmit specific electric power to the external device 602.

Figure 7A:
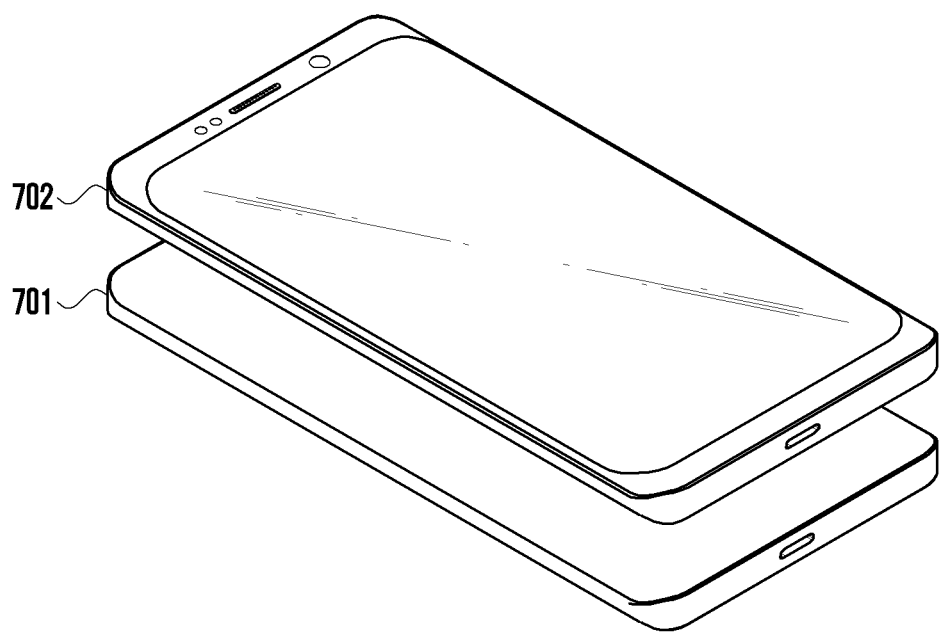
FIG. 7A is an illustration of wirelessly charging an external electronic device by using a wireless charging function of an electronic device according to an embodiment.
Figure 7B:
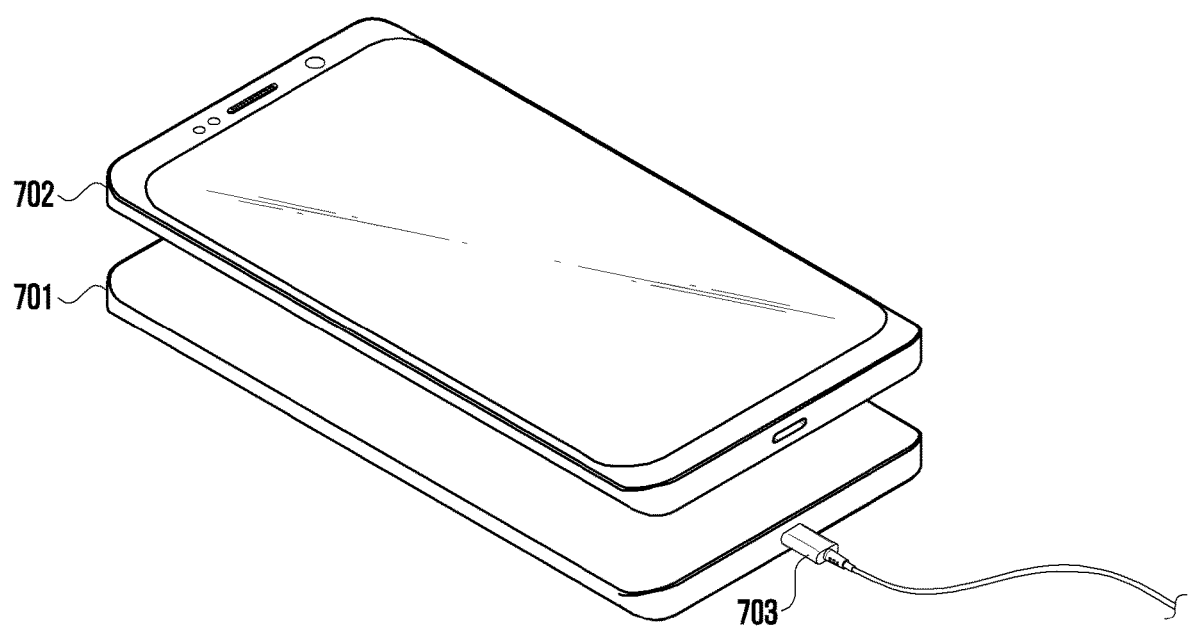
FIG. 7B is an illustration of wirelessly charging an external electronic device by using a wireless charging function of an electronic device according to an embodiment.

FIG. 7A is an illustration of wirelessly charging an external electronic device 702 by using a wireless charging function of an electronic device 701, and FIG. 7B is an illustration of wirelessly charging the external electronic device 702 by using the wireless charging function of the electronic device 701. Although FIGS. 7A and 7B illustrate examples in which the external electronic device (e.g., a wireless power receiving device) 702 is a smartphone, the wireless power receiving device 702 may be various electronic devices that may be wirelessly charged by receiving relatively high electric power (e.g., 7.5 V/7.5 W).

Referring to FIG. 7A, the electronic device 701 (e.g., the electronic device 101 of FIG. 1) may activate a wireless power Tx mode based on a user input, and may wirelessly supply electric power to the external electronic device 702 by using electric power of the battery 510 (e.g., the batter 510 of FIG. 5) if the wireless power Tx mode is activated.

Referring to FIG. 7B, when a wired power supplying device (e.g., AFC, a QC, or PD) (with reference to 9 V/15 W) for QC is connected to the electronic device 701 according to an embodiment of the present disclosure, the electronic device 701 may receive electric power from the wired power supplying device 703 to supply electric power to the external electronic device 702 and charge the battery 510 as well. For example, only the wired power supplying device 703 that supports QC is connected to the electronic device 701, the electronic device 701 may receive electric power from the wired power supplying device 703 and wirelessly supply the electric power to the external electronic device 702.

If the wireless power Tx mode is activated, the electronic device 701 may identify the external device 702 according to specific standards (e.g., WPC standards), and may determine specific electric power corresponding to the identified external device 702. For example, the electronic device 701 may identify that the external device 702 is a smartphone, and may determine first specified power (e.g., 7.5 V/7.5 W) corresponding to the smartphone. The electronic device 701 may wirelessly transmit specific electric power by using an external power source provided from the wired power supplying device 703. For example, the electronic device 701 may FSK-modulate a transmission device parameter, and may transmit a signal obtained by FSK-modulating the transmission device parameter to the external device 702, together with a power signal. The electronic device 701 may receive a response to the signal obtained by FSK-modulating the transmission device parameter from the external device 702, and may determine specific electric power corresponding to the external device 702 at least based on the received response. The electronic device 701 may wirelessly transmit specific electric power to the external device 702.

FIG. 8 is a block diagram of a wireless power circuit of an electronic device 801 in a Tx mode according to an embodiment.

Referring to FIG. 8, the electronic device 801 (e.g., the electronic device 301 of FIG. 3) includes a coil 850 (e.g., the coil 350 of FIG. 3), a wireless charging IC 840 (e.g., the wireless charging IC 840 of FIG. 3), a PMIC 820 (e.g., the PMIC 320 of FIG. 3), a battery 830 (e.g., the battery 330 of FIG. 3), an external power source (e.g., AFC, QC, PD, or an USB) 803, and/or a controller 810 (e.g., the processor 120 of FIG. 1).

The wireless charging IC 840 may wirelessly transmit and receive information, which is necessary for wireless power transmission, through in-band communication with an external electronic device 802 (e.g., the second electronic device 302 of FIG. 3) according to the WPC standards. For example, the in-band communication may indicate that data are transmitted to the external electronic device 802 though a frequency modulation of a wireless power transmission signal in the Tx mode.

The wireless charging IC 840 may include a radio frequency (RF) power generator/regulator 842 and a communication circuit 841.

The RF power generator/regulator 842 may be operated as an RF power generator (inverter) when the electronic device 801 is operated in the Tx mode.

The communication circuit 841 may be a circuit configured to communicate with the external electronic device 802. For example, the communication circuit 841 may generate a signal obtained by FSK-modulating a transmission device parameter to communicate with the external electronic device 802 when the electronic device 801 is operated in the Tx mode.

The communication circuit 841 may communicate with the communication circuit of the external electronic device 802 by using a frequency that is the same as or close to a frequency which is used by the coil 850 to transmit electric power. For example, the communication circuit 841 may FSK-modulate a transmission device parameter, and may transmit a signal obtained by FSK-modulating the transmission device parameter to the external device 802, together with a power signal. For example, the communication circuit 841 may transmit data to the external electronic device 802 that is a power receiving device (e.g., a sink device) by using FSK modulation.

The power signal that is transmitted when the electronic device 801 is operated in the Tx mode may be a wireless signal of a band of 110 kHz to 190 kHz. The communication circuit 841 may generate a signal of a band around $\Delta 0.2\%$ to 5% as compared with the band of the power signal, for example, 104.5 kHz to 199.5 kHz. For example, when the FSK modulation is performed, the communication circuit 841 may modulate a positive signal such that the positive signal is a signal of a frequency (e.g., 110.7 kHz) that is greater than 110 kHz when the power transmission frequency is a frequency that is greater than the power signal frequency, for example, 110 kHz. For example, the communication circuit 841 may modulate a negative signal such that the negative signal is a signal of a frequency (e.g., 109.6 kHz) that is less than 110 kHz when the power transmission frequency is a frequency that is less than the power signal frequency, for example, 110 kHz).

When the electronic device 801 is in a Tx mode, the communication circuit 841 may set a depth including a scaling factor for calculating an FSK modulation depth to 0, and may generate a signal of a band around $\Delta 0.3\%$ as compared with the power signal.

When the electronic device 801 is in a Tx mode, the communication circuit 841 may set a depth including a scaling factor for calculating an FSK modulation depth to 3, and may generate a signal of a band around $\Delta 3.2\%$ as compared with the power signal.

The transmission device parameter transmitted when the electronic device 801 is operated in the Tx mode is a capacity packet, and may include identification information on the electronic device 801, information on the battery 830, information on a TA connected to the electronic device 801, information on electric power which is supplied based on the information on the battery 830 and the information on the TA, or information on a transmission mode (e.g., a voltage, a current, and an electric power).

Figure 9:
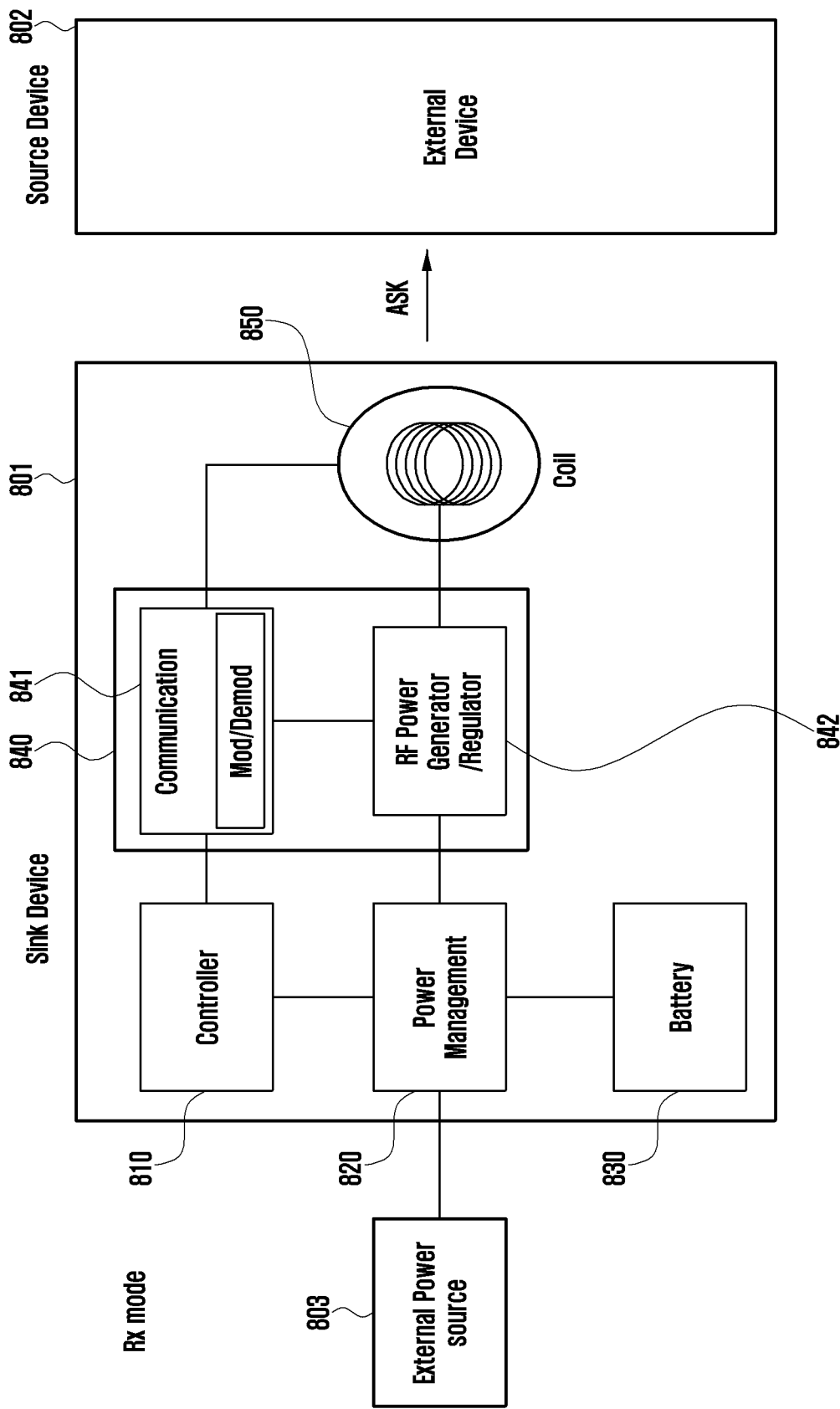
FIG. 9 is a block diagram of a wireless power circuit of an electronic device in an Rx mode according to an embodiment.

FIG. 9 is a block diagram of a wireless power circuit of an electronic device in an Rx mode according to an embodiment. The electronic device illustrated in FIG. 9 may have a configuration that is the same as or similar to the electronic device illustrated in FIG. 8. In FIG. 9, the elements that are substantially the same as those of FIG. 8 are denoted by the same reference symbols, and hereinafter, only an operation corresponding to the case in which the wireless power circuit is in an Rx mode is described below.

Referring to FIG. 9, the wireless charging IC 840 may wirelessly transmit information, which is necessary for wireless power transmission, through in-band communication with an external electronic device 802 (e.g., the second electronic device 302 of FIG. 3) according to the WPC standards. For example, the in-band communication may indicate that data are transmitted to the external electronic device 802 though an amplitude modulation in the Rx mode.

The RF power generator/regulator 842 may be operated as a rectifier when the electronic device is operated in the Rx mode.

The communication circuit 841 may be a circuit configured to communicate with the external electronic device 802. For example, the communication circuit 841 may generate a signal obtained by ASK-modulating a reception device parameter to communicate with the external electronic device 802 when the electronic device 801 is operated in the Rx mode.

The communication circuit 841 may communicate with the communication circuit of the external electronic device 802 by using a frequency that is the same as or close to a frequency, which is used by the coil 850 to receive electric power. The communication circuit 841 may ASK-modulate the reception device parameter, and may transmit a signal obtained by ASK-modulating the reception device parameter. For example, the communication circuit 841 may transmit data to the external electronic device 802 that is a power transmitting device (e.g., a source device) by using ASK modulation.

The communication circuit 841 may generate a signal having a voltage change of $\Delta 1\%$ to 30% as compared with the voltage of a power signal received when the electronic device 801 is operated in the Rx mode. For example, the communication circuit 841 may control a circuit connected to the coil when the electronic device 801 is operated in the Rx mode to ASK-modulate the reception device parameter such that the external electronic device 802 that is the power transmitting device (e.g., a source device) recognizes that a load is changed in the external electronic device 802.

The reception device parameter transmitted when the electronic device 801 is operated in the Rx mode may include information on a request for change of a charging mode (e.g., a voltage, a current, electric power), identification information on the electronic device 801, information on electric power that may be received, information on the state of received electric power, or information on the battery 830.

A method for driving an electronic device (e.g., the electronic device 801 of FIG. 8) according to various embodiments of the disclosure may include, an operation of, when a wireless power circuit (e.g., the wireless charging IC 840 of FIG. 8) is in a Tx mode, transmitting a wireless power signal through a coil (e.g., the coil 850 of FIG. 8) by using the wireless charging IC 840, and transmitting a signal obtained by FSK-modulating a transmission device parameter by using a communication circuit (e.g., the communication circuit 841 of FIG. 8), to an external electronic device (e.g. the external electronic device 802) through the coil 850, and an operation of, when the wireless charging IC 840 is in an Rx mode, receiving wireless power by using the wireless charging IC 840 to charge the battery 830, and transmitting a signal obtained by ASK-modulating a reception device parameter by using the communication circuit 841, to the external electronic device 802 through the coil 850. The wireless power signal may be a wireless signal of a band of 110 kHz to 190 kHz. The operation of FSK-modulating the transmission device parameter may include an operation of FSK-modulating the transmission device parameter to a signal of a band around Δ0.2% to 5% as compared with the band of the wireless power signal, by using the communication circuit 841. The operation of FSK-modulating the transmission device parameter may include setting a depth including a scaling factor to 0, and FSK-modulating the transmission device parameter to a signal of a band around Δ0.3% as compared with the band of the wireless power signal. The operation of FSK-modulating the transmission device parameter may include setting a depth including a scaling factor to 3, and FSK-modulating the transmission device parameter to a signal of a band around Δ3.2% as compared with the band of the wireless power signal. The transmission device parameter includes at least one of identification information on the electronic device 801, information on the battery 830, information on a TA connected to the electronic device 801, information on electric power which is supplied based on the information on the battery 830 and the information on the TA, or information on a Tx mode. The method may further include an operation of, when the wireless charging IC 840 is in the Tx mode, receiving a response signal on a signal obtained by modulating the transmission device parameter, from the external electronic device 802, and an operation of transmitting a specific wireless power signal determined based on the response signal, through the coil 850. The operation of ASK-modulating the reception device parameter may include ASK-modulating the reception device parameter to a signal having a voltage change of Δ1% to 30% as compared with the voltage of the received wireless power, by using the communication circuit 841.

Figure 10:
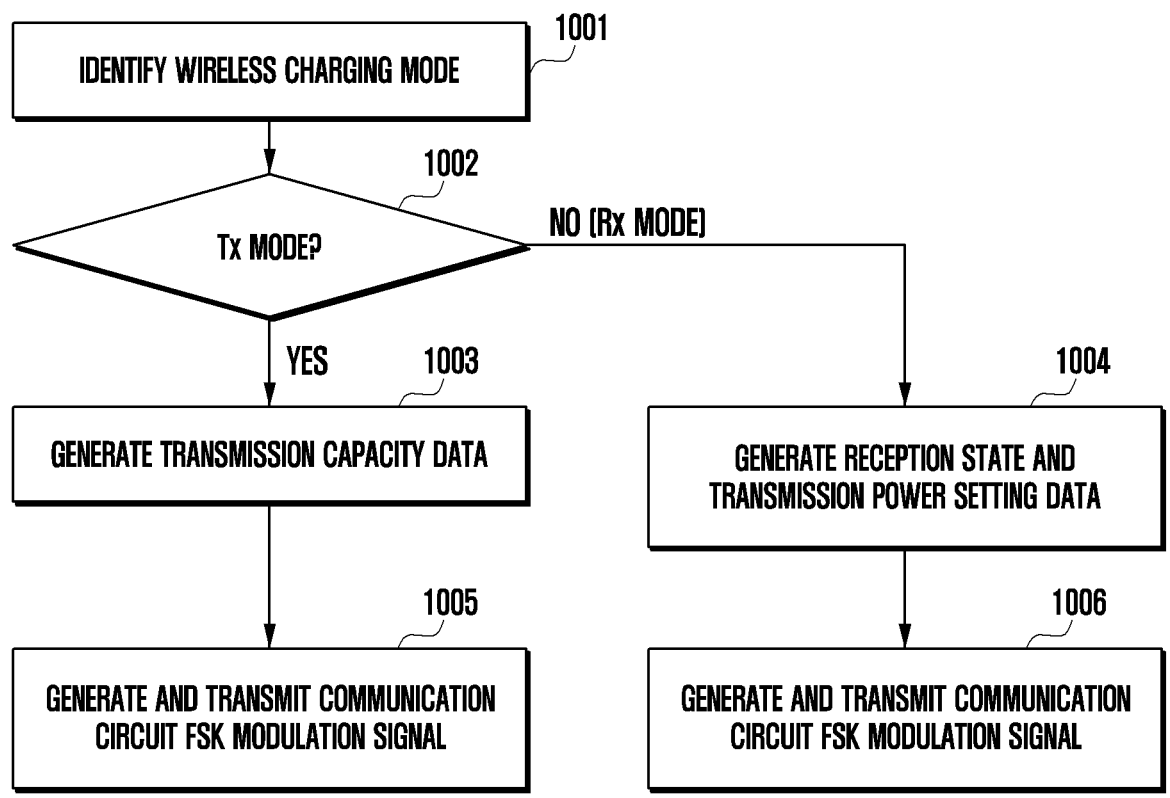
FIG. 10 is a flowchart of a method of an electronic device according to an embodiment.

FIG. 10 is a flowchart of a method of an electronic device according to an embodiment.

Referring to FIG. 10, in steps 1001 and 1002, the electronic device (e.g., the electronic device 801 of FIG. 8) may identify a wireless charging mode, and may identify whether the electronic device 801 is in the Tx mode The electronic device 801 may perform step 1003 in the Tx mode and may perform step 1004 in the Rx mode.

In step 1003, the electronic device 801 may generate capacity data as a transmission device parameter in the Tx mode. For example, the transmission device parameter is a capacity packet, and may include identification information on the electronic device 801, information on the battery (e.g., the battery 830 of FIG. 8), information on a TA connected to the electronic device 801, information on electric power which is supplied based on the information on the battery 830 and the information on the TA, or information on a Tx mode (e.g., a voltage, a current, or electric power).

In step 1005, the electronic device 801 may transmit a signal obtained by FSK-modulating the transmission device parameter by using the communication circuit 841, through the coil. For example, the electronic device 801 may FSK-modulate the transmission device parameter to a signal of a band around Δ0.2% to 5% as compared with the band of the wireless power signal, by using the communication circuit 841.

In step 1004, the electronic device 801 may generate information on a request for a change of a charging mode (e.g., a voltage, a current, or electric power), identification information on the electronic device 801, information on electric power that may be received, information on the state of received electric power, or information on the battery 830, as a reception device parameter in the Rx mode.

In step 1006, the electronic device 801 may transmit a signal obtained by ASK-modulating the reception transmission device parameter to the external electronic device 802 by using the communication circuit 841, through the coil. For example, the electronic device 801 may ASK-modulate the reception device parameter to a signal having a voltage change of Δ1% to 30% as compared with the voltage of the received wireless power, by using the communication circuit 841. For example, the communication circuit 841 may control a circuit connected to the coil when the electronic device is operated in the Rx mode to ASK-modulate the reception device parameter such that the external electronic device 802 that is the power transmitting device (e.g., a source device) recognizes that a load is changed in the external electronic device 802.

The electronic device may be one of various types of electronic devices. The electronic devices may include, for example, a portable communication device (e.g., a smartphone), a computer device, a portable multimedia device, a portable medical device, a camera, a wearable device, or a home appliance. However, the electronic devices are not limited to those described above.

Various embodiments of the present disclosure and the terms used herein are not intended to limit the present disclosure to particular embodiments but include various changes, equivalents, or replacements for a corresponding embodiment. With regard to the description of the accompanying drawings, similar reference numerals may be used to refer to similar or related elements. A singular form of a noun corresponding to an item may include one or more of the things, unless the relevant context clearly indicates otherwise. Herein, each of such phrases as "A or B," "at least one of A and B," "at least one of A or B," "A, B, or C," "at least one of A, B, and C," and "at least one of A, B, or C," may include any one of, or all possible combinations of, the items enumerated together in a corresponding one of the phrases. As used herein, such terms as "1$^{st}$," "2nd," "first," and "second" may be used to simply distinguish a corresponding component from another component, but does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

The term "module" may include a unit implemented in hardware, software, or firmware, and may interchangeably be used with other terms, for example, "logic," "logic block," "part,'" or "circuitry". A module may be a single integral component, or a minimum unit or part thereof, adapted to perform one or more functions. For example, a module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include code generated by a complier or code executable by an interpreter. The machine-readable storage medium may be provided in the form of a non-transitory storage medium. Wherein, the term "non-transitory" simply indicates that the storage medium is a tangible device, but does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a non-transitory machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the non-transitory machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by a module, a program, or another component may be carried out sequentially, in parallel, repeatedly, or heuristically, one or more of the operations may be executed in a different order or omitted, or one or more other operations may be added.

While the present disclosure has been shown and described with reference to certain embodiments thereof, it will be understood by those skilled in the art that various changes in form and details may be made therein without departing from the scope of the present disclosure as defined by the appended claims and their equivalents.

What is claimed is:
1. A portable terminal comprising:
a battery;
a power management circuit electrically connected to the battery;
a coil;
a communication circuit electrically connected with the coil;
a wireless charging circuit electrically connected with the coil; and
a controller operatively connected with the power management circuit, the communication circuit and the wireless charging circuit, the controller configured to:
identify whether the portable terminal is set to function as a wireless power transmitter or as a wireless power receiver;
based at least in part on the portable terminal being set to function as the wireless power receiver, control the wireless charging circuit to receive a first wireless power signal from a first external electronic device through the coil, control the power management circuit to charge the battery using the first wireless power signal received from the first external electronic device, and control the communication circuit to transmit, through the coil, to the first external electronic device a first parameter corresponding to a wireless power receiver function; and
based at least in part on the portable terminal being set to function as the wireless power transmitter, control the wireless charging circuit to transmit a second wireless power signal to the first external electronic device or a second external electronic device through the coil, control the power management circuit to supply power to the wireless charging circuit, and control the communication circuit to transmit, through the coil, to the first external electronic device or the second external electronic device a second parameter corresponding to a wireless power transmitter function,
wherein the wireless charging circuit is configured to:
modulate, using the communication circuit, the first parameter with a first modulation scheme before the first parameter is transmitted to the first external electronic device; and
modulate, using the communication circuit, the second parameter with a second modulation scheme different from the first modulation scheme before the second parameter is transmitted to the first external electronic device or the second external electronic device.

2. The portable terminal of claim 1, wherein the wireless charging circuit is configured to:
perform the modulating of the first parameter using a frequency shift keying (FSK) as the first modulation scheme; and
perform the modulating of the second parameter using an amplitude shift keying (ASK) as the second modulation scheme.

3. The portable terminal of claim 1, further comprising a wired interface electrically connected with the power management circuit,
wherein the controller is configured to:
detect that a third external electronic device is connected with the portable terminal via the wired interface; and
control the power management circuit to supply power to or to receive power from the detected third external electronic device through the wired interface.

4. The portable terminal of claim 3, wherein the controller is configured to:
based at least in part on the portable terminal being set to function as the wireless power transmitter, control the power management circuit to supply power to the wireless charging circuit for the second wireless power signal and the battery using the power supplied from the detected third external electronic device.

5. The portable terminal of claim 3, wherein the controller is configured to:

based at least in part on the portable terminal being set to function as the wireless power receiver, control the power management circuit to supply power to the detected third external device and the battery using the first wireless power signal received from the first external electronic device.

6. The portable terminal of claim 3, wherein the power management circuit is configured to:
perform the supplying of the power to the detected external device based at least in part on the detected third external electronic device corresponding to an on-the-go device or a power-demanding device; and
perform the receiving of the power from the detected third external electronic device based at least in part on the detected third external electronic device corresponding to a power-supplying device.

7. The portable terminal of claim 3, wherein the power management circuit is configured to:
change a first power generated by using the battery to a second power greater than the first power,
supply at least a portion of the second power to the wireless charging circuit, and
supply a remaining power of the second power to the third external electronic device via the wired interface.

8. The portable terminal of claim 3, further comprising a display,
wherein the controller is configured to control the display to:
display at least one object corresponding to at least one of the first electronic device, the second electronic device and the third external electronic device connected wirelessly through the coil or connected through the wired interface, and
display information indicating each battery level of the at least one of the first electronic device, the second electronic device and the third external electronic device.

9. The portable terminal of claim 8, wherein the controller is configured to control the display to:
display information indicating whether power is being supplied to at least one connected device among the first electronic device, the second electronic device and the third external electronic device, or
display information indicating whether power is being received from the at least one connected device among the first electronic device, the second electronic device and the third external electronic device.

10. The portable terminal of claim 8, wherein the controller is configured to:
when a plurality of external devices among the first electronic device, the second electronic device and the third external electronic device are connected to the portable terminal through the coil or the wired interface, display a user interface for adjusting power supplied to the plurality of external devices; and
determine, based on a user input through the user interface, a priority of power to be supplied to the plurality of external devices.

11. A method of a portable terminal, the method comprising:
identifying whether the portable terminal is set to function as a wireless power transmitter or as a wireless power receiver;
based at least in part on the portable terminal being set to function as the wireless power receiver, controlling a wireless charging circuit to receive a first wireless power signal from a first external electronic device through a coil, controlling a power management circuit to charge the battery using the first wireless power signal received from the first external electronic device, and controlling a communication circuit to transmit, through the coil, to the first external electronic device a first parameter corresponding to a wireless power receiver function;
based at least in part on the portable terminal being set to function as the wireless power transmitter, controlling the wireless charging circuit to transmit a second wireless power signal to the first external electronic device or a second external electronic device through the coil, controlling the power management circuit to supply power to the wireless charging circuit, and controlling the communication circuit to transmit, through the coil, to the first external electronic device or the second external electronic device a second parameter corresponding to a wireless power transmitter function;
modulating, using the communication circuit, the first parameter with a first modulation scheme before the first parameter is transmitted to the first external electronic device; and
modulating, using the communication circuit, the second parameter with a second modulation scheme different from the first modulation scheme before the second parameter is transmitted to the first external electronic device or the second external electronic device.

12. The method of claim 11, further comprising:
performing the modulating of the first parameter using a frequency shift keying (FSK) as the first modulation scheme; and
performing the modulating of the second parameter using an amplitude shift keying (ASK) as the second modulation scheme.

13. The method of claim 11, further comprising:
detecting that a third external electronic device is connected with the portable terminal via a wired interface; and
controlling the power management circuit to supply power to or to receive power from the detected third external electronic device through the wired interface.

14. The method of claim 13, further comprising:
based at least in part on the portable terminal being set to function as the wireless power transmitter, controlling the power management circuit to supply power to the wireless charging circuit for the second wireless power signal and the battery using the power supplied from the detected third external electronic device.

15. The method of claim 13, further comprising:
based at least in part on the portable terminal being set to function as the wireless power receiver, controlling the power management circuit to supply power to the detected third external device and the battery using the first wireless power signal received from the first external electronic device.

16. The method of claim 13, further comprising:
performing the supplying of the power to the detected external device based at least in part on the detected third external electronic device corresponding to an on-the-go device or a power-demanding device; and
performing the receiving of the power from the detected third external electronic device based at least in part on the detected third external electronic device corresponding to a power-supplying device.

17. The method of claim 13, further comprising:
changing a first power generated by using the battery to a second power greater than the first power;

supplying at least a portion of the second power o the wireless charging circuit; and supplying a remaining power of the second power to the third external electronic device via the wired interface.

18. The method of claim 13, further comprising:

displaying at least one object corresponding to at least one of the first electronic device, the second electronic device and the third external electronic device connected wirelessly through the coil or connected through the wired interface; and displaying information indicating each battery level of the at least one of the first electronic device, the second electronic device and the third external electronic device.

19. The method of claim 18, further comprising:

displaying information indicating whether power is being supplied to at least one connected device among the first electronic device, the second electronic device and the third external electronic device; or displaying information indicating whether power is being received from the at least one connected device among the first electronic device, the second electronic device and the third external electronic device.

20. The method of claim 18, further comprising:

when a plurality of external devices among the first electronic device, the second electronic device and the third external electronic device are connected to the portable terminal through the coil or the wired interface, displaying a user interface for adjusting power supplied to the plurality of external devices; and determining, based on a user input through the user interface, a priority of power to be supplied to the plurality of external devices.

* * * * *